Jan. 29, 1963    B. STRONG    3,075,239
MANUFACTURE OF HOLLOW ARTICLES FROM ORGANIC PLASTIC MATERIALS
Filed Feb. 9, 1959
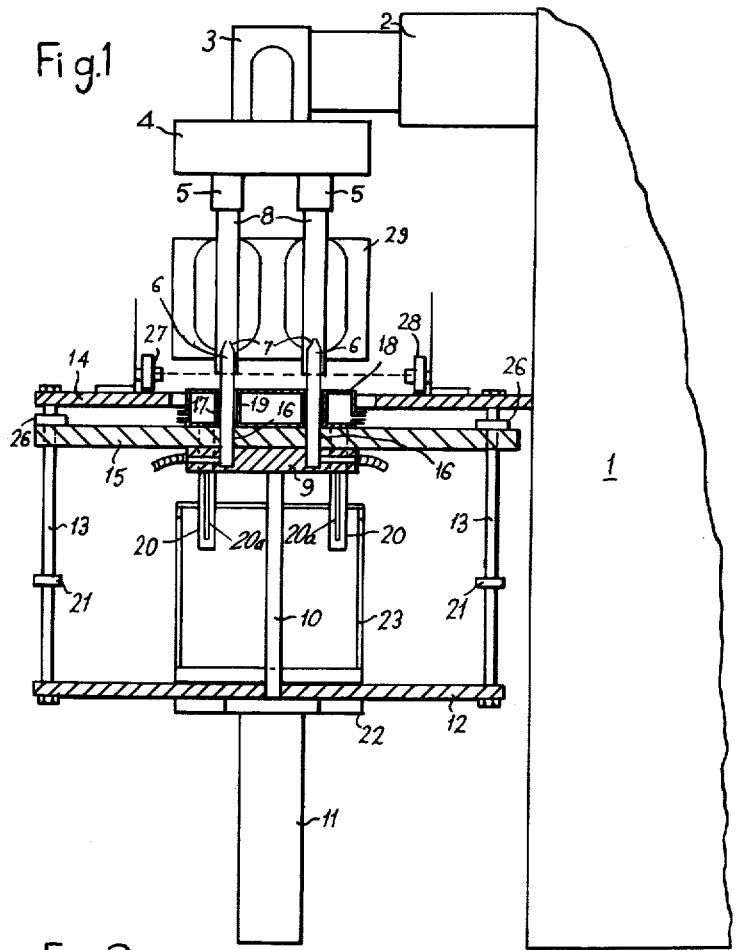
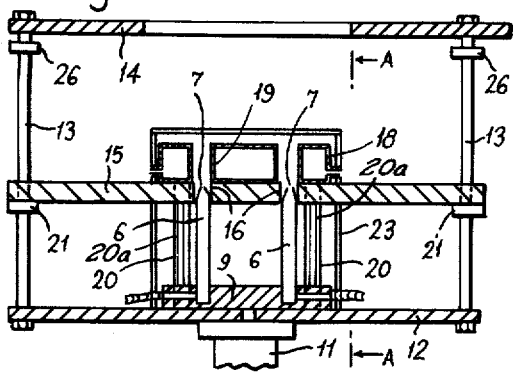
Inventor
B. STRONG
By
Holcombe Wetherill & Brindisi
Attorneys United States Patent Office 3,075,239
Patented Jan. 29, 1963

3,075,239
MANUFACTURE OF HOLLOW ARTICLES FROM ORGANIC PLASTIC MATERIALS
Bernard Strong, Northwood Hills, Middlesex, England, assignor to E. Shipton & Company Limited, Northwood Hills, England, a British company
Filed Feb. 9, 1959, Ser. No. 792,140
Claims priority, application Great Britain Feb. 11, 1958
9 Claims. (Cl. 18—5)

The invention relates to the manufacture of hollow articles, such as bottles, from organic plastic materials, such as polythene or nylon, by blowing an extruded length of tube of the plastic material to conform with a surrounding mould cavity.

From one aspect, the invention consists in the method of making hollow articles from organic plastic materials which consists in downwardly extruding a tube of the plastic material from a downwardly directed annular extrusion nozzle, stopping extrusion after a length of tube has been extruded which is sufficient to make the required article, the lower end of said tube passing over a blowing nozzle or having a blowing nozzle inserted therein, closing a multi-part mould about the extruded tube length so as to compress the lower end of the tube on to the blowing nozzle and to pinch the tube walls together at the top of the mould cavity without severing the part of the tube within the mould cavity from the part of the tube extending between the mould and the extrusion nozzle, admitting a blowing fluid through the blowing nozzle to expand the part of the tube within the mould cavity to form an article conforming with the shape of the mould cavity, and, after the article has rigidified, opening the mould, then lowering the blowing nozzle with the article attached thereto so as to pull apart the still softened plastic tube in the vicinity of the extrusion nozzle and thus sever the article from the plastic material in the extrusion nozzle, and removing the severed article from the blowing nozzle.

The invention also consists in a machine for making hollow articles from organic plastic materials by the process of blowing an extruded tube of the material within a mould, comprising a downwardly directed annular nozzle, means for extruding plastic material through said annular nozzle to form a tube of plastic material suspended from the nozzle, means for stopping extrusion through said annular nozzle when a desired length of tube has been extruded, a blowing nozzle mounted for up and down movement between a raised position in which the blowing nozzle is disposed directly beneath the annular nozzle and a lowered position, the blowing nozzle being of a size such that it can enter the end of the bore of the tube of plastic material extruded through the annular nozzle, a multi-part mould mounted for opening and closing movement around the extruded tube and having parts at the top of the mould cavity which, when closed, pinch the walls of the extruded tube together at a position spaced below the annular nozzle, and having further parts at the bottom of the mould cavity which compress the tube around and against the blowing nozzle, means for supplying blowing fluid to the blowing nozzle to blow the length of tube confined within the mould cavity into the shape of the cavity, and means for raising and lowering the blowing nozzle.

According to a feature of the invention, the plastic material is extruded through an extrusion head comprising a plurality of downwardly directed annular extrusion nozzles, so that a plurality of tubes will be simultaneously extruded, with each of which a separate blowing nozzle is associated and around which are closed the parts of separate moulds or of a multi-cavity mould, the closing and opening of the mould parts, the admission of blowing fluid, and the lowering of the blowing nozzle to sever the articles from the plastic material in their associated extrusion nozzles, taking place in the sequence above indicated.

According to a further feature of the invention, whilst extrusion is stopped through one nozzle head (comprising one or more extrusion nozzles) and the blowing, severing and ejection steps are taking place thereat, the plastic material is extruded through another nozzle head (comprising one or more extrusion nozzles) or in sequence through two or more nozzle heads, each nozzle head having associated therewith one or more moulds and blowing nozzles which are controlled in sequence with the extrusion thereat so that whilst extrusion is taking place at one nozzle head, the other steps of the manufacturing process are taking place at the other nozzle head or at one or more of the other nozzle heads. Extrusion through the different nozzle heads may be controlled by change-over valve means, for example by a rotary distributor valve as described in United States Patent No. 2,724,860, issued November 29, 1955 or No. 2,854,691 issued October 7, 1958.

The length of plastic tube extruded at a nozzle head, whether the machine comprises one or more nozzle heads, is preferably controlled by photo-electric measuring means as described in the aforesaid Patent No. 2,854,691.

In order that the invention may be more clearly understood, reference will now be made to the accompanying drawing in which:

FIGURE 1 shows diagrammatically a side view partly in section along the dividing line of the moulded parts, of a part of a machine for carrying out the invention with the nozzles in the raised position.

FIGURE 2 is a similar view with the nozzles in the lowered position.

FIGURE 3 is a section on the line A—A in FIGURE 2.

The machine to be described is a modification of the machine described in aforesaid Patent No. 2,854,691. It comprises a housing 1 containing a motor for driving an extruder through a clutch, the extruder outlet 2 connecting with a rotary distributor valve 3 by means of which the plastic may be selectively fed to one or other of two nozzle heads arranged at opposite sides of the front of the machine as described in the specification. Only one of the nozzle heads is indicated at 4 in the drawing, the head being equipped with two downwardly directed annular extrusion nozzles 5. The housing 1 also accommodates the mechanism for actuating the distributor valve, the photo-cell amplifier, temperature controls and other ancillary apparatus as described in the aforesaid specification.

According to this invention, blowing tubes 6 having nozzles 7 at their upper ends are arranged respectively directly below the annular extrusion nozzles 5, the diameters of the nozzle 7 being smaller than the internal diameter of the aforesaid tubes 8 extruded through the nozzles 5 so that the nozzles can extend into the lower ends of the plastic tubes.

The blowing tubes 6 are secured in an upwardly pointing direction on a support bar 9 which is carried at the upper end of the piston rod 10 of a double acting compressed air piston fixed on a bar 12 secured to the lower ends of vertical guide rods 13, the upper ends of which are secured to a platform or transverse member 14 secured to the machine housing 1.

Slidable on the guide rods 13 is a stripper bar 15 provided with apertures 16 through which the upwardly projecting blowing tubes 6 pass. On the stripper bar 15 is supported a tank 18 having tubular passages 17 extending upwardly therethrough in alignment with the apertures 16 and through which the blowing tubes can also move. The passages 17, however, should be in close sliding contact with the blowing tubes 6 so that the blowing tubes and the nozzles can be cooled by cooling water which is flowed through the tank 18. The support bar 9 and the stripper bar 15 are interconnected by a lost-motion connection which, in the embodiment shown, comprises links 20 secured to and depending downwardly from the stripper bar 15 and having slots 20a, closed at their lower ends, through which pegs 20b projecting from the side of the support bar 9 pass and can slide, whereby to limit the vertical distance by which the support bar and stripper plate may be separated so as to prevent the upper ends of the blowing tube 6 from moving out from the underside of the apertures 16. When the piston rod 10 is lowered, the support bar 9 and the stripper bar 15 move downwardly together until the stripper bar is stopped by engaging with stop members 21 secured on the guide rods 13, further downward movement of the piston rod 10 withdrawing the blowing tubes and nozzles through the stripper bar so that the blown hollow plastic articles which move downwardly with the nozzles as hereinafter explained will be stripped from the nozzles by engagement with the top of the tank 18. As the support bar completes its downward movement to rest on the spacer bar 12, it engages with a rocking plate 22 carrying an L-shaped ejector bar 23 (FIGURE 3) whereby to rock the ejector bar 23 to move from the position shown in dotted lines to the position shown in full lines thereby to eject the blown hollow articles which have been stripped from the nozzles off of the top of the stripper bar and into a collecting box or discharge chute. The rocker plate 22 is counterbalanced so as to rock to the dotted line position as soon as the support bar moves away from the spacer bar 12. A cam member 24 may be provided on the ejector bar which is engaged by the support bar in its upward movement in order positively to move the ejector bar to the position shown in dotted lines.

By admitting compressed air to the lower end of the cylinder 11 the piston rod 10 is raised. This firstly raises the support bar to move the nozzle tubes through the apertures 16 and 19 until the support bar engages the stripper bar and both bars continue their upward movement together. The height to which the nozzles are raised may be set by stops 26 which are adjustable on the guide bars 13 and limit the height to which the stripper bar 15, and consequently the support bar 9, can be raised.

The length of the plastic tubes 8 extruded from the annular nozzles 5 is controlled by a photo-electric cell 27, the light beam projected from the lamp 28 being interrupted by the ends of the tubes when the desired length has been extruded. The light beam is disposed so as to pass close to the sides of the nozzles 7 so that it is not interrupted thereby but will be interrupted only by the lower ends of the extruded plastic tubes. This photo-electric cell control operates to disengage the clutch in the drive to the extruder, and to effect the automatic control of the distributor valve 3, the closing and opening of the moulds and the other machine operations in the manner described in the aforesaid specification.

The mould 29 in which the plastic tubes are blown is indicated in the drawing as a double cavity two-part mould for making plastic bottles. The cavities are arranged so that the bottles will be made in the inverted position, that is with their bottoms facing upwardly and their neck portions at the bottom of the mould. The top edge of the mould is spaced below the lower ends of the nozzles 5 and the moulds are so formed that when the two mould parts are closed together, they will pinch the tubes 8 together at the upper ends of the cavities but without completely cutting through or severing the plastic material. The nozzles 7 are made of a diameter corresponding to the internal diameter of the passage through the bottle neck required in the finished bottle so that when the mould parts are closed together the neck portions of the cavities compress and form the plastic material thereat against the nozzle and thus "size" the internal diameter of the neck. The external configuration of the neck with any desired screw thread is formed when the mould parts are closed together, any excess plastic material thereat spewing out between the lands defining the neck shape and into the space provided in the moulds outside these lands for receiving the spewed out material. The mould parts are moved to the closed or open position with a parallel movement which may be effected by any suitable mechanism, such as a toggle mechanism, which is supported on the platform 14 or from any other suitable part of the machine.

After the mould parts have been closed together, compressed air is admitted through the blow tubes 6 to expand the lengths of plastic tube confined within the mould cavities. After a time interval sufficient to allow the blown articles to rigidify (the moulds may be water cooled in known manner to accelerate this rigidifying) the moulds are opened and compressed air is admitted to the cylinder 11 to commence the lowering of the blowing tubes. Since the plastic material around the nozzles 7 has been compressed and cooled thereagainst, the formed bottles adhere to the nozzles 7 and the parts of the extruded tube which project above the upper edge of the mould, and which have at least partially rigidified, are torn away from the plastic material in the nozzle at approximately the level of the lower ends of the nozzles 5, since here the plastic material is still highly plastic. To maintain plasticity at this point the nozzles 5 may be electrically heated. Consequently the blown articles move downward affixed to the nozzles 7 and are subsequently stripped therefrom by the stripper plate 15—18 and ejected by the ejector 23.

By the plastic material tearing at the level of the bottoms of the annular nozzles 5 the next lengths of tube to be extruded through the nozzles have their ends open and of full bore so as to pass easily over the nozzles.

The sequence of operations of extrusion, mould-closing, blowing, mould-opening, and lowering and raising the blow nozzles, and also changing over the distributor valve 3 for extrusion from the second nozzle head may be automatically controlled in the manner described in the aforesaid specification.

The control of the cylinder 11 may be effected by valves actuated by the control mechanism at appropriate instants in the time cycle which valves may replace the valves for the ejection cylinders described in the aforesaid specification which are not incorporated in the present machine. The valves controlling the cylinder 11 may be so timed that the nozzles 7 will be raised to their uppermost position before extrusion of the tubes 8 is completed, so that the tubes 8 will be extruded around the nozzles 7, or alternatively the nozzles may be located in the lowered position or a partially lowered position during extrusion and only be raised to pass into the lower ends of the extruded tubes after extrusion has been stopped.

Whilst a particular embodiment has been described, it will be understood that various modifications may be made without departing from the scope of the invention as defined by the appended claims. For example, the nozzles can be shaped to provide any desired undercut to ensure that the blown article will positively remain on the nozzle until it is removed by the stripper bar. The nozzles 7 may be interchangeable for making different sizes of hollow articles and if the article is too small to be efficiently stripped from the nozzle by the apertures 19, an auxiliary stripper plate with smaller apertures may be mounted on the top thereof.

What I claim is:

1. The method of making hollow articles from organic plastic materials which consists in downwardly extruding a tube of the plastic material from a downwardly directed annular extrusion nozzle, stopping extrusion after a length of tube has been extruded which is sufficient to make the required article, passing the lower end of said tube over a blowing nozzle, closing a multi-part mould, which is mounted at a fixed distance below the extrusion nozzle, about the extruded tube length so as to pinch the tube walls together at the top of the mould cavity without severing the part of the tube within the mould cavity from the part of the tube extending between the mould and the extrusion nozzle and to compress the lower end portion of the tube on to the blowing nozzle, maintaining the blowing nozzle at a temperature lower than the melting point of the plastic material whereby the internal surface of said compressed lower end portion of the extruded tube is rigidified against and grips the blowing nozzle, and while the mould is closed and stationary, admitting a blowing fluid through the blowing nozzle to expand the part of the tube within the mould cavity to form an article conforming with the shape of the mould cavity, and, after the article has rigidified, opening the mould, then lowering the blowing nozzle with the article attached thereto so as to pull apart the still softened plastic tube in the vicinity of the extrusion nozzle and thus sever the article from the plastic material in the extrusion nozzle, removing the severed article from the blowing nozzle, and raising the blowing nozzle to be level with and be embraced by the lower part of the mould when closed, the next cycle of operation, starting with downwardly extruding another tube of plastic material, commencing only after the blowing nozzle has been lowered to sever the article from the material in the extrusion nozzle.

2. Machine for making hollow articles from organic plastic materials by the process of blowing an extruded tube of the material within a mould, comprising a downwardly directed annular nozzle, means for extruding plastic material through said annular nozzle to form a tube of plastic material suspended from the nozzle, means for stopping extrusion through said annular nozzle when a desired length of tube has been extruded, a blowing nozzle mounted for up and down movement between a raised position in which the blowing nozzle is disposed directly beneath the annular nozzle and a lowered position, the blowing nozzle being of a size such that it can enter the end of the bore of the tube of plastic material extruded through the annular nozzle, a multi-part mould mounted in a fixed position and at a fixed distance below the annular nozzle for opening and closing movement around the extruded tube and having parts at the top of the mould cavity which, when closed, pinch the walls of the extruded tube together at a position spaced below the annular nozzle without severing the plastic material confined in the mould from the plastic material between the mould and the annular nozzle, and having further parts at the bottom of the mould cavity which compress the lower end portion of the tube around and against the blowing nozzle when in its raised position, means for cooling the blowing nozzle to a temperature lower than the melting point of the plastic material whereby the internal surface of said compressed lower end portion of the extruded tube is rigidified against and grips the blowing nozzle, means for supplying blowing fluid to the blowing nozzle to blow the length of tube confined within the mould cavity into the shape of the cavity, and means for raising and lowering the blowing nozzle.

3. A machine for making hollow articles from organic plastic material by the process of blowing an extruded tube of the material within a mould, comprising a downwardly directed annular extrusion nozzle, means for extruding plastic material through said extrusion nozzle to form a tube of plastic material suspended from the nozzle, a blowing nozzle mounted for up and down movement between a raised position in which blowing nozzle is disposed directly beneath the annular extrusion nozzle and a lowered position, the blowing nozzle being of a size such that it can enter the end of the bore of the tube of plastic material extruded through the extrusion nozzle, a multi-part mould mounted in a fixed position and at a fixed distance directly below the extrusion nozzle, means for opening and closing said mould, said mould having a mould cavity and parts at the top of the mould cavity which, when closed, pinch together the walls of a length of extruded tube positioned therebetween without severing the plastic material confined in the mould from the plastic material between the mould and the annular nozzle, and having further parts at the bottom of the mould cavity which compress the tube around and against the blowing nozzle when in its raised position, means for supplying blowing fluid to the blowing nozzle to blow the length of tube confined within the mould cavity into the shape of the cavity, means for raising and lowering the blowing nozzle, a stripper member mounted below the mould and having an opening through which the blowing nozzle movably passes so that when the blowing nozzle is lowered the stripper member will push the hollow article off the blowing nozzle, said stripping member being formed with a passage therein, means for flowing a cooling fluid through said passage, for cooling the stripper member, the nozzle being in contact with the cooled stripper member when the blowing nozzle is in its lowered position, whereby said blowing nozzle is cooled and maintained at a temperature below the melting point of the plastic material.

4. A machine for making hollow articles from organic plastic material by the process of blowing an extruded tube of the material within a mould, comprising a downwardly directed annular extrusion nozzle, means for extruding plastic material through said extrusion nozzle to form a tube of plastic material suspended from the nozzle, a blowing nozzle mounted for up and down movement between a raised position in which blowing nozzle is disposed directly beneath the annular extrusion nozzle and a lowered position, the blowing nozzle being of a size such that it can enter the end of the bore of the tube of plastic material extruded through the extrusion nozzle, a multi-part mould mounted in a fixed position and at a fixed distance directly below the extrusion nozzle, means for opening and closing said mould, said mould having a mould cavity and parts at the top of the mould cavity which, when closed, pinch together the walls of a length of extruded tube positioned therebetween wtihout severing the plastic material confined in the mould from the plastic material between the mould and the annular nozzle, and having further parts at the bottom of the mould cavity which compress the tube around and against the blowing nozzle, means for supplying blowing fluid to the blowing nozzle to blow the length of tube confined within the mould cavity into the shape of the cavity, means for raising and lowering the blowing nozzle, a stripper member mounted below the mould and having an opening through which the blowing nozzle movable passes so that when the blowing nozzle is lowered the stripper member will push the hollow article off the blowing nozzle, an ejector mounted for movement from a first position to one side of the stripper member to a second position in which it passes above the opening in the stripper member, and means actuated by the movement of the blowing nozzle as it approaches its lowermost position for moving the ejector to said second position to eject the hollow article which has been stripped from the blowing nozzle by the stripper member.

5. A machine for making hollow articles from organic plastic material by the process of blowing an extruded tube of the material within a mould, comprising a downwardly directed annular extrusion nozzle, means for extruding plastic material through said annular extrusion nozzle to form a tube of plastic material suspended from the nozzle, a vertically arranged blowing tube having a blowing nozzle at its upper end and mounted for up and down movement between a raised position in which the blowing nozzle is disposed directly beneath the annular extrusion nozzle and a lowered position, a multi-part mould having a mould cavity and mounted for opening and closing movement on the machine and so disposed that, when the mould is closed with the blowing tube in its raised position, the blowing nozzle will extend into the mould cavity, a stripper member mounted below the mould and having an opening through which the blowing tube is adapted to slide during its up and down movement, said stripper member being mounted for vertical movement on guides and being moved up and down by the movement of the blowing tube, stop means for limiting the up and down movement of the stripper member, and a lost-motion connection between the stripper member and the blowing tube which permits the blowing tube to move downwards further than the stripping member to a position in which the blowing nozzle is positioned beneath the top of the stripper member.

6. A machine as claimed in claim 5, comprising also an ejector pivoted to the machine, said ejector having a part engaged by a member which moves with the blowing tube when the blowing tube approaches its lowermost position to move the ejector across the top of the opening in the stripper member.

7. A machine for making hollow articles from organic plastic material by the process of blowing an extruded tube of the material within a mould, comprising a downwardly directed annular extrusion nozzle, means for feeding plastic material to said nozzle to extrude a plastic tube therethrough, a multi-part mould positioned below said extrusion nozzle, means for opening and closing said mould, a blowing tube mounted vertically and directly beneath and in alignment with said extrusion nozzle, a piston carried by the machine and connected to said blowing tube to move the latter vertically from a raised position in which the upper end of the blowing tube is embraced by the mould parts, when closed, and a lowered position in which the upper end of the blowing tube is spaced below the bottom of the mould, a stripper member having an opening therein surrounding the blowing tube, means supporting said stripper member on vertical guides for vertical movement, stop means limiting the upper and lower positions of movement of said stripper member, lost motion means interconnecting the blowing tube with the means supporting the stripper member, said lost motion means restricting the relative movement between the blowing tube and the stripper member to a distance which prevents the upper end of the blowing tube from being moved below the bottom of the stripper member, a passage in said stripper member, means for flowing a cooling fluid through said passage, and means for supplying a blowing fluid to said blowing tube.

8. A machine as claimed in claim 7, comprising also an ejector pivoted to the machine, said ejector having a part engaged by a member which moves with the blowing tube when the blowing tube approaches its lowermost position to move the ejector across the top of the opening in the stripper member.

9. A machine as claimed in claim 7, comprising a plurality of annular extrusion nozzles and a plurality of blowing tubes each aligned respectively with one of the extrusion nozzles, and a plurality of mould cavities associated respectively with each blowing tube, wherein the plural blowing tubes are carried from a common member actuated by the piston, and the stripper member has a plurality of openings therein through which the blowing tubes respectively extend.

References Cited in the file of this patent
UNITED STATES PATENTS

| | | |
|---|---|---|
| 2,724,860 | Strong | Nov. 29, 1955 |
| 2,787,023 | Hagen et al. | Apr. 2, 1957 |
| 2,810,934 | Bailey | Oct. 29, 1957 |
| 2,898,633 | Burch | Aug. 11, 1959 |
| 2,928,120 | Leghorn et al. | Mar. 15, 1960 |
| 2,930,079 | Parfrey | Mar. 29, 1960 |
| 2,936,481 | Wilkalis et al. | May 17, 1960 |

FOREIGN PATENTS

| | | |
|---|---|---|
| 1,029,586 | France | Mar. 11, 1953 |
| 163,661 | Australia | June 28, 1955 |
| 1,105,529 | France | July 6, 1955 |
| 1,109,688 | France | Sept. 28, 1955 |
| 744,927 | Great Britain | Feb. 15, 1956 |
| 203,875 | Australia | Oct. 25, 1956 |